(12) United States Patent
Sheridan et al.

(10) Patent No.: US 12,253,043 B2
(45) Date of Patent: Mar. 18, 2025

(54) THERMAL MANAGEMENT OF EXHAUST GAS WITH HCCI EVENT

(71) Applicant: Cummins Inc., Columbus, IN (US)

(72) Inventors: Todd A. Sheridan, Fortville, IN (US); Steve D. Hart, Columbus, IN (US); Ryan Todd Pettyjohn, Seattle, WA (US)

(73) Assignee: Cummins Inc., Columbus, IN (US)

( * ) Notice: Subject to any disclaimer, the term of this patent is extended or adjusted under 35 U.S.C. 154(b) by 150 days.

(21) Appl. No.: 17/930,228

(22) Filed: Sep. 7, 2022

(65) Prior Publication Data

US 2023/0138153 A1  May 4, 2023

Related U.S. Application Data

(60) Provisional application No. 63/263,179, filed on Oct. 28, 2021.

(51) Int. Cl.
  *F02B 1/12* (2006.01)
  *F02D 41/02* (2006.01)
  *F02D 41/40* (2006.01)
  *F02D 41/30* (2006.01)

(52) U.S. Cl.
  CPC ....... *F02D 41/401* (2013.01); *F02D 41/0235* (2013.01); *F02D 41/403* (2013.01); *F02D 41/405* (2013.01); *F02D 41/0255* (2013.01); *F02D 41/3041* (2013.01)

(58) Field of Classification Search
  CPC .............. F02D 41/3041; F02D 41/401; F02D 41/0235; F02D 41/403; F02D 41/405; F02B 1/12
  See application file for complete search history.

(56) References Cited

U.S. PATENT DOCUMENTS

| | | | |
|---|---|---|---|
| 7,121,255 B2 | 10/2006 | Liu et al. | |
| 7,631,489 B2 | 12/2009 | Liu et al. | |
| 7,742,867 B2 | 6/2010 | Liu et al. | |
| 7,900,600 B2 | 3/2011 | Nakazono et al. | |
| 7,992,538 B2 * | 8/2011 | Yamashita | F01L 13/0005 123/305 |
| 8,096,108 B2 * | 1/2012 | Najt | F02D 41/06 60/276 |
| 8,397,490 B2 | 3/2013 | Shibata et al. | |
| 8,544,444 B2 * | 10/2013 | Hitomi | F02D 15/00 123/294 |
| 11,840,976 B2 * | 12/2023 | Hokazono | F02D 13/0234 |
| 2008/0156293 A1 | 7/2008 | Huang | |

FOREIGN PATENT DOCUMENTS

EP  0982489 B1  10/2003

* cited by examiner

*Primary Examiner* — Gonzalo Laguarda
(74) *Attorney, Agent, or Firm* — Taft, Stettinius & Hollister LLP (57) ABSTRACT

A system, apparatus and method for exhaust gas thermal management can employ a homogenous charge compression event in one or more cylinders to increase the output temperature from the cylinder to heat the exhaust gas in response to a thermal management condition associated with operation of the internal combustion engine.

20 Claims, 3 Drawing Sheets

THERMAL MANAGEMENT OF EXHAUST GAS WITH HCCI EVENT

CROSS-REFERENCE TO RELATED APPLICATION

The present application claims the benefit of the filing date of U.S. Provisional App. Ser. No. 63/263,179 filed on Oct. 28, 2021, which is incorporated herein by reference.

FIELD OF THE DISCLOSURE

This disclosure relates generally to internal combustion engine operation, and more particularly to thermally managing the exhaust gas temperature produced by internal combustion engine operation with a homogeneous charge compression ignition (HCCI) event.

BACKGROUND

Aftertreatment devices are well known and widely used in various internal combustion engine applications for the aftertreatment of engine exhaust gases. Aftertreatment devices such as oxidation catalysts, particulate filters, and selective catalytic reduction (SCR) devices have been useful for handling and/or removing controlled pollutants, including carbon monoxide, nitric oxide, unburned hydrocarbons, sulfur, and soot in the exhaust stream of a diesel engine.

Thermal management of the exhaust gas of an internal combustion engine can provide operational benefits such as more efficient and more effective aftertreatment device operations. Turbochargers with variable geometry (VG) inlets, exhaust throttles, intake throttles, exhaust gas recirculation bypass, and/or late post-combustion heat injections, among others, have been used to decrease engine efficiency, reduce charge flow, and/or increase charge temperature to thermally manage the exhaust gas temperature. However, these techniques also suffer from practical limitations in implementation due to combustion problems that may result such as high smoke and hydrocarbon emissions, inability to achieve target temperatures, and excessive inefficiency. Therefore, further improvements in this technology are needed.

SUMMARY

Systems, methods, and apparatuses for thermal management of exhaust gas for effective operation and/or regeneration of aftertreatment device(s) that receive the exhaust gas from operation of a multi-cylinder internal combustion engine are disclosed. In some embodiments, the system or apparatus in which the method is employed can include at least one aftertreatment device, an internal combustion engine including a plurality of cylinders for producing exhaust gas treated by the at least one aftertreatment device, and a fueling system. The at least one aftertreatment device can include, for example, a catalyst and/or a particulate filter. The reciprocating engine can be a four-stroke engine. The fuel injector can be a common-rail type fuel injector, although other fueling systems are also contemplated.

An HCCI event is produced that is timed early during the compression stroke so that little or no effective work is produced, thereby increasing the temperature of the exhaust gas output from the cylinder. The early HCCI event can be used alone or in conjunction with one or more other thermal management techniques as a supplement for increasing the exhaust gas temperature. In an embodiment, the fuel ignition for the HCCI event is facilitated by providing increased exhaust residuals in the cylinder prior to the HCCI event to produce higher in-cylinder temperatures for igniting the charge early in the compression stroke so that little or no work is produced by the HCCI event.

Various strategies for mitigating potentially adverse effects of the early HCCI event are also contemplated. For example, the HCCI event fuel injection can be timed to occur immediately after exhaust valve closing so that the piston is positioned to prevent the injected fuel from reaching the cylinder wall. Fuel injection could also be timed to occur in the middle of the intake stoke where the incoming intake gas velocity will prevent the fuel from reaching the cylinder wall. In an embodiment, the early HCCI event is conducted on cylinder(s) that will not perform a subsequent nominal combustion event, thereby preventing higher NOx, hydrocarbon, or smoke emissions from the cylinder. In an embodiment, the cylinder numbers conducting the early HCCI event are changed or rotated dynamically to reduce thermal stresses on the associated engine components, such as the exhaust manifold. In an embodiment, the early HCCI event operation is suspended during certain operating conditions, such as during a transmission shift in which higher torque broadcast accuracy is required.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
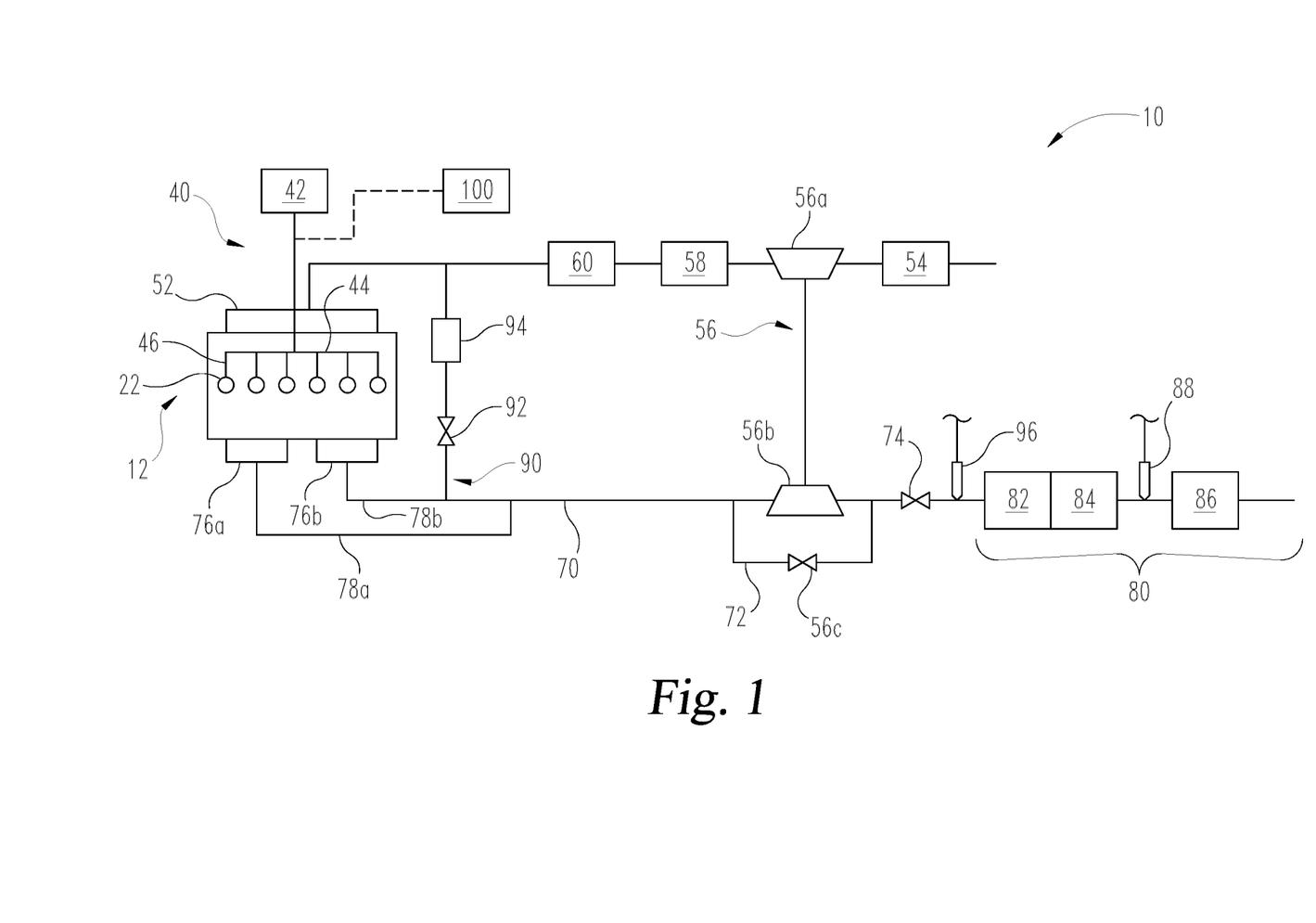
FIG. 1 shows one embodiment of a system that includes an internal combustion engine with an aftertreatment system and at least one aftertreatment device for which the exhaust gas output is thermally managed.

With reference to FIG. 1, a system 10 is shown that includes a four-stroke internal combustion engine 12. FIG. 1 illustrates an embodiment of the engine 12 that is a diesel engine. The engine 12 can include a plurality of cylinders 22. FIG. 1 includes the plurality of cylinders 22 in an arrangement that includes six cylinders in an in-line arrangement for illustration purposes only. Any number of cylinders and any arrangement of the cylinders suitable for use in an internal combustion engine can be utilized. The number of cylinders 22 that can be used can range from one cylinder to eighteen or more. Furthermore, the following description at times will be in reference to one of the cylinders 22. It is contemplated that corresponding features in reference to the cylinder 22 described in FIG. 2 and at other locations in the present application can be present for all or a subset the other cylinders of engine 12.

Figure 2:
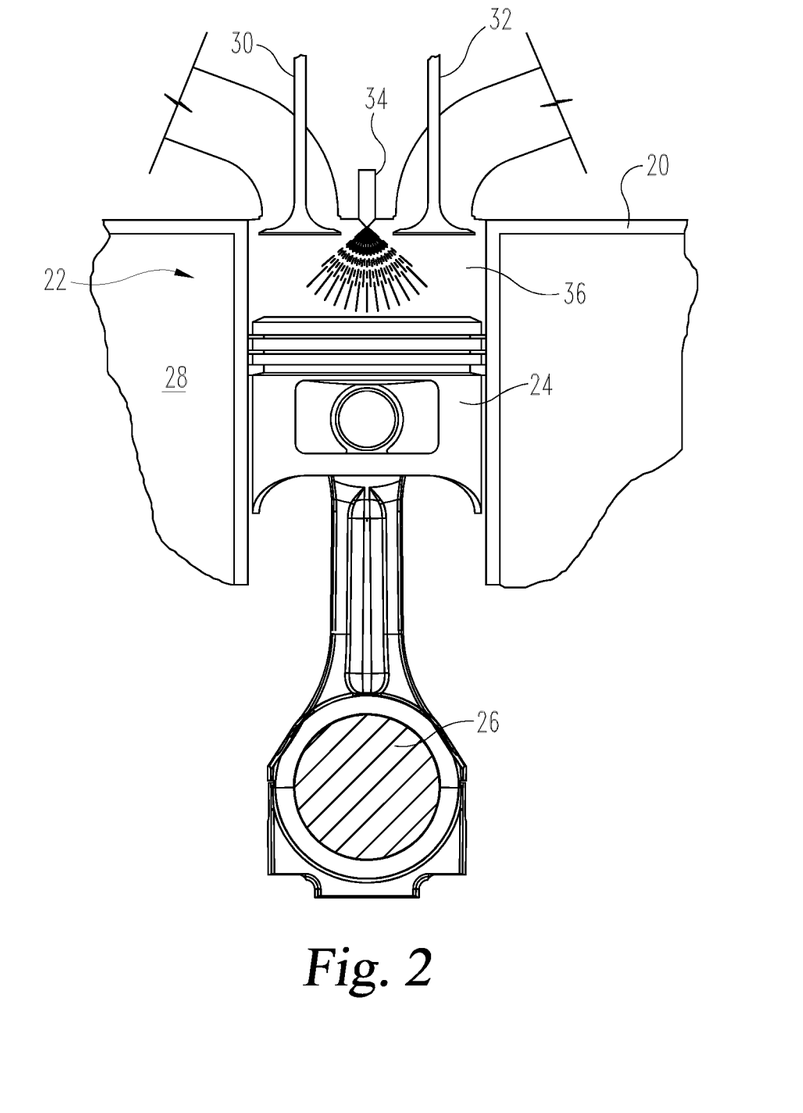
FIG. 2 is a schematic of a cylinder of the engine of the system of FIG. 1.

The cylinder 22 houses a piston 24 that is rotatably attached to a crankshaft 26 that is rotated by reciprocal movement of piston 24 in cylinder 22. Within a cylinder head 28 of the cylinder 22, there is at least one intake valve 30, at least one exhaust valve 32 and a fuel injector 34 that provides fuel to a combustion chamber 36 formed by cylinder 22 between the piston 26 and the cylinder head 28.

The term "four-stroke" as used herein means the following four strokes—intake, compression, power, and exhaust—that the piston 24 completes during two separate revolutions of the engine's crankshaft 26 to complete one cycle of operation. A stroke begins either at a top-dead-center (TDC) when the piston 24 is at the cylinder head 28 of the cylinder 22, or at a bottom-dead-center (BDC), when the piston 24 has reached its lowest point in the cylinder 22.

During the intake stroke, the piston 24 descends away from cylinder head 28 of the cylinder 22 to a bottom (not shown) of the cylinder, thereby reducing the pressure in the combustion chamber 36 of the cylinder 22. In the instance where the engine 12 is a diesel engine, a combustion charge is created in the combustion chamber 36 by an intake of air through the intake valve 30 when the intake valve 30 is opened.

The fuel from the fuel injector 34 is supplied by a high pressure common-rail system 40 that is connected to the fuel tank 42. Fuel from the fuel tank 42 is suctioned by a fuel pump (not shown) and fed to a rail 44. The fuel fed from the fuel pump is accumulated in the rail 44, and the accumulated fuel is supplied to the fuel injector 34 of each cylinder 22 through a fuel line 46. The accumulated fuel in common rail system can be pressurized to boost and control the fuel pressure of the fuel delivered to combustion chamber 36 of cylinders 22.

During the compression stroke, both the intake valve 30 and the exhaust valve 32 are closed, the piston 24 returns toward TDC. As discussed further below, the fuel injector 34 can be controlled to inject fuel in an amount and timing so that a HCCI event is produced in one or more of the cylinders 22 for one or more cycles of operation in response to a thermal management condition. The HCCI event occurs early in the compression stroke so that a very low effective expansion ratio is produced in the cylinder with little or no torque output. This early HCCI event increases the exhaust gas temperature since most of the fuel energy exits the cylinder in the form of exhaust heat.

For nominal combustion events to produce work, fuel is injected near TDC in the compressed air, and the compressed fuel-air mixture ignites in the combustion chamber 36 after a short delay. The ignition of the air and fuel causes a rapid increase in pressure in the combustion chamber 36, which is applied to the piston 24 during its power stroke toward the BDC. In contrast to the early HCCI event discussed above, combustion phasing in combustion chamber 36 is calibrated so that the increase in pressure in combustion chamber 36 pushes piston 24, producing an effective expansion ratio that provides a net positive in the force/work/power of piston 24.

During the exhaust stroke, the piston 24 is returned toward TDC while the exhaust valve 32 is open. This action discharges the burnt products of the combustion of the fuel in the combustion chamber 36 and expels the spent fuel-air mixture (exhaust gas) out through the exhaust valve 32. The early HCCI event of the present disclosure increases the temperature of this exhaust gas output.

The intake air flows through an intake passage 50 and intake manifold 52 before reaching the intake valve 30. The intake passage 50 may be provided with one or more of an air cleaner 54, a compressor 56a of a turbocharger 56, and an intake air throttle 58. The intake air is purified by the air cleaner 54, compressed by the compressor 56a and then aspirated into the combustion chamber 36 through the intake air throttle 58. The intake air throttle 58 can be controlled to influence the air flow into the cylinder.

The intake passage 50 can further be provided with a cooler 60 that is downstream of the compressor 56a. In one example, the cooler 60 can be a charge air cooler (CAC). In this example, the compressor 56a can increase the temperature and pressure of the intake air, while the CAC 60 can increase a charge density and provide more air to the cylinders. In another example, the cooler 60 can be a low temperature aftercooler (LTA). The CAC 60 uses air as the cooling media, while the LTA uses coolant as the cooling media.

The exhaust gas flows out from the combustion chamber 36 into an exhaust passage 70 that is provided with a turbine 56b and a wastegate 56c of the turbocharger 56 and then into an aftertreatment device 80. The exhaust gas that is discharged from the combustion chamber 36 drives the turbine 56b to rotate. The wastegate 56c is a device that enables part of the exhaust gas to by-pass the turbine 56b through a passageway 72. Less exhaust gas energy is thereby available to the turbine 56b, leading to less power transfer to the air compressor 56a. Typically, this leads to reduced intake air pressure rise across the compressor 56a and lower intake air density/flow. The wastegate 56c can be an open/close valve, or a full authority valve allowing control over the amount of by-pass flow or anything between. In another embodiment, turbine 56b is a variable geometry turbine with an adjustable inlet to the control the flow of exhaust gas therethrough. The exhaust passage 70 can further or alternatively include an exhaust throttle 74 for adjusting the flow of the exhaust gas through the exhaust passage 70. The exhaust gas, which can be a combination of by-passed and turbine flow, then enters the aftertreatment device 80.

Optionally, a part of the exhaust gas in the exhaust passage 70 can be recirculated into the intake air via an exhaust gas recirculation passage (EGR passage) 90. The EGR passage 90 connects the exhaust passage upstream of the turbine 56b to the intake passage 50 downstream of the intake air throttle 58. Alternatively or additionally, a low pressure EGR system (not shown) can be provided downstream of turbine 56b and upstream of compressor 56a. An exhaust gas recirculation valve (EGR valve) 92 for regulating the exhaust gas recirculation flow (EGR flow) is provided on the EGR passage 90. The EGR passage 90 can be further provided with an EGR cooler 94. Although not shown a bypass around EGR cooler 94 can also be provided. EGR passage 90 is shown connected to intake passage 50 downstream of CAC cooler 60, but can also be connected upstream of CAC cooler 60.

In one embodiment, exhaust gases are expelled into an common exhaust manifold. In the illustrated embodiment, the exhaust manifold is divided into two manifold portions 76a, 76b that receive exhaust gases from a respective first and second portions of the cylinders 22. The outlets 78a, 78b from the exhaust manifold portions 76a, 76b combine downstream of EGR passage 90 either upstream of turbine 56b, or at a single inlet or a twin entry inlet to turbine 56b. Still other embodiment contemplate more than two exhaust manifold portions 76a, 76b dedicated to respective portions of the plurality of cylinders 22.

The aftertreatment device 80 herein means one or more devices useful for handling and/or removing material from exhaust gas that may be harmful constituents, including carbon monoxide, nitric oxide, nitrogen dioxide, hydrocarbons, and/or soot in the exhaust gas. In some examples, the aftertreatment device 80 can include at least one of a catalytic device and a particulate matter filter. The catalytic device can be a diesel oxidation catalyst (DOC) device, ammonia oxidation (AMOX) catalyst device, a selective catalytic reduction (SCR) device, three-way catalyst (TWC), lean NOX trap (LNT) etc. The reduction catalyst can include any suitable reduction catalysts, for example, a urea selective reduction catalyst. The particulate matter filter can be a diesel particulate filter (DPF), a partial flow particulate filter (PFF), etc. A PFF functions to capture the particulate matter in a portion of the flow; in contrast the entire exhaust gas volume passes through the particulate filter.

The arrangement of the components in the aftertreatment device 80 can be any arrangement that is suitable for use with the engine 12. For example, in one embodiment as shown in FIG. 1, a DOC 82 and a DPF 84 are provided upstream of a SCR device 86. In one example, a reductant delivery device 88 is provided between the DPF 84 and the SCR device 86 for injecting a reductant into the exhaust gas upstream of SCR device 86. The reductant can be urea, diesel exhaust fluid, or any suitable reductant injected in liquid and/or gaseous form.

The exhaust passage 70 can optionally include a hydrocarbon (HC) injector 96 that is provided downstream of turbine 56b and upstream of DOC 82. The HC injector 96 can inject hydrocarbons, which can be, for example, fuel from fuel tank 86 or a secondary storage source of hydrocarbons. The hydrocarbons can be from any suitable hydrocarbon containing fluid or a reformate. In the example shown in FIG. 1, the HC injector 96 and the aftertreatment device 80 are configured so that the fuel is dosed between an outlet of the turbine 56b and an inlet of DOC 82 upstream of the aftertreatment device 80. In this instance, the injection of the hydrocarbons can increase the temperature of the exhaust gas through oxidation of the injected hydrocarbons across the DOC 82 and the concomitant release of energy.

In another embodiment, hydrocarbons are additionally or alternatively injected in-cylinder into one or more of the cylinders 22 through a direct injector connection with a hydrocarbon storage source or through a connection with common rail 44. The hydrocarbon injection into the cylinder combustion chambers 36 can occur at a late post injection fuel timing, for example after the injection of fuel to satisfy the torque request, where at least a portion of the late post injection hydrocarbons do not combust in cylinders 22 of engine 12. In one embodiment, the common rail fuel system is responsive to an in-cylinder dosing command from a controller 100 to inject an amount of hydrocarbons or fuel in-cylinder into one or more of the cylinders 22. In one embodiment, in-cylinder dosing can be provided to any cylinder 22 for one or more of nominal combustion, a late heat post injection, and an early HCCI event.

A controller 100 is provided to receive data as input from various sensors, and send command signals as output to various actuators. Some of the various sensors and actuators that may be employed are described in detail below. Any of the sensors can be real, physical sensors, or virtual sensors that derive output values from one or more operating parameters. The controller 100 can include a processor, a memory, a clock, and an input/output (I/O) interface.

The sensors (not shown) that can be provided include a mass air flow sensor (MAF) that detects the amount of intake air, a differential pressure sensor for one or more of the aftertreatment device 80, temperature sensors which detect the exhaust gas temperature upstream and downstream or at an inlet and outlet, respectively, of the aftertreatment device 80, an air/fuel (oxygen) sensor which detects the air/fuel ratio of the air/fuel mixture supplied to the combustion chamber, a crank angle sensor that detects a crank angle at intervals of a specified crank angle so as to detect the rotational angle position and the rotation speed of the crankshaft 26, and a pressure sensor to detect the fuel pressure of the common rail 44 and/or fuel injector 34. Other sensors that can be provided include an intake manifold pressure and temperature sensor for estimating an intake air flow using speed-density calculation (instead of a MAF), an exhaust pressure sensor, an engine out NOx sensor, and a tail pipe NOx sensor. The listing of sensors is exemplary only and some of the listed sensors may not be provided, and/or other types of sensors may also be provided.

The actuators that can be provided include actuators for opening and closing the intake valves 30, for opening and closing the exhaust valves 32, for injecting fuel from the fuel injector 34, for injecting hydrocarbons from the HC injector 74, for opening and closing the wastegate 56c or adjusting the inlet of a VGT, for EGR valve 92, for the intake air throttle 58, and for the exhaust throttle 74. The actuators are not illustrated in FIG. 1, but one skilled in the art would know how to implement the mechanism needed for each of the components to perform the intended function.

During operation, the controller 100 can receive information from the various sensors listed above through the I/O interface, process the received information using the processor based on an algorithm stored in the memory, and then send command signals to the various actuators through the I/O interface. For example, the controller 100 can receive information regarding a temperature input, process the temperature input, and then based on the temperature input and control strategy, send a command signal to one or more actuators to increase the exhaust gas temperature in response to a thermal management condition. The thermal management condition can be, for example, a temperature condition, a warm-up condition, a keep-warm condition, a desoot condition, and/or a regeneration condition.

The controller 100 can be configured to implement the disclosed thermal management method with system 10. In one embodiment, the disclosed method involves adjusting one or more operating conditions of engine 12 in response to the thermal management condition to increase the exhaust gas temperature to achieve a target condition. The term "target condition" herein means a state of the system 10 during operation, such as the state of the exhaust gas exiting cylinder 22, within the exhaust passage 70, or other location, and can include the temperature of the exhaust gas, a temperature of one or more components of the aftertreatment device 80, a temperature of one or more components of the exhaust system, and/or other exhaust system parameters. In a specific embodiment, the target condition is a target temperature at the inlet of the DOC 82.

In one instance, one or more operating conditions are adjusted so as to achieve one or more target conditions of the exhaust gas in response to the thermal management condition. In some examples, the target condition of the exhaust gas enables effective or more efficient operation of the aftertreatment device 80 such that a minimum desired or target operating temperature is obtained and/or maintained. In some examples, the target condition of the exhaust gas enable regeneration of the aftertreatment device 80. Regeneration of the aftertreatment device means desorbing hydrocarbons and/or removing particulate matter and/or removing reversible poisons/aggregates accumulated in the aftertreatment device that can influence the performance or lead to damage of the aftertreatment device.

In other implementations, when the target condition for the exhaust gas is achieved, material from exhaust gas accumulated in the aftertreatment device 80 can be removed effectively. In some examples, the target condition for the exhaust gas is a target temperature of the exhaust gas or exhaust component at a particular position in the exhaust passageway 70. In one specific example, when the DOC 82 and DPF 84 are to be regenerated, the target temperature is a range of temperatures of the exhaust gas/component at the DOC 82 of the aftertreatment device 80. In some instances, the target condition is an exhaust gas/component temperature in a range above about 200° C. In another instance the target condition is an exhaust gas temperature in a range between 250° C. and 300° C. In another example, the target temperature condition can range from 400° C. to 650° C. In other examples, the target condition is a temperature above 280° C., above 400° C., and above 500° C.

Figure 3:
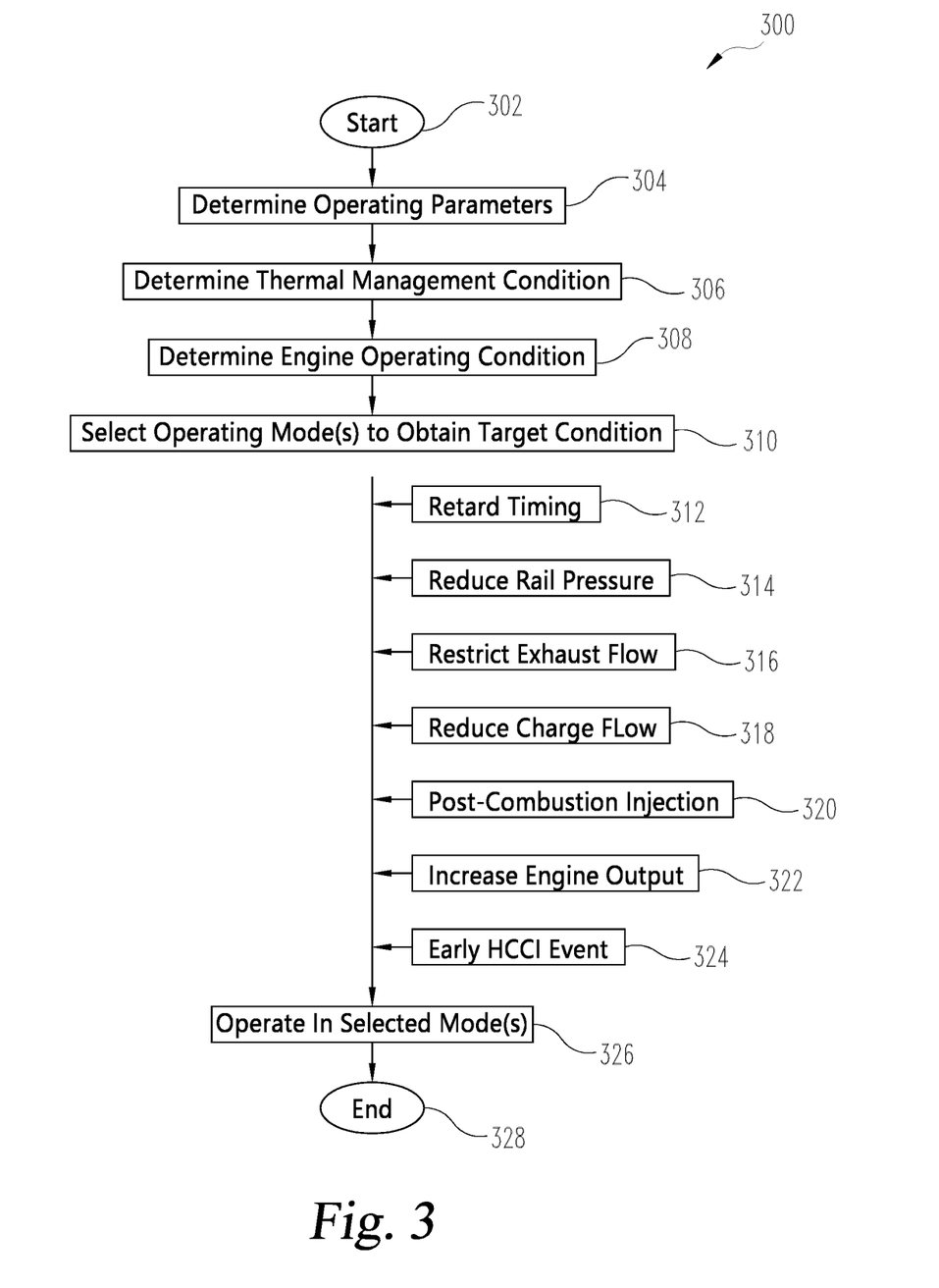
FIG. 3 shows a flow diagram of one embodiment of a procedure for thermally managing the exhaust gas.

The control procedures implemented by the controller 100 to achieve the one or more target conditions in response to the thermal management condition will now be described. In general, the procedures described in FIG. 3 are executed by a processor of controller 100 executing program instructions (algorithms) stored in the memory of the controller 100. The description below can be implemented with system 10.

In certain embodiments, the system 10 further includes a controller 100 structured to perform certain operations to control system 10 in achieving one or more target conditions. In certain embodiments, the controller forms a portion of a processing subsystem including one or more computing devices having memory, processing, and communication hardware. The controller may be a single device or a distributed device, and the functions of the controller 100 may be performed by hardware or software on a non-transient computer readable storage medium. More specific descriptions of certain embodiments of controller operations are included in the section referencing FIG. 3.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

With reference to FIG. 3, in one embodiment, the disclosed procedure 300 initiates at step 302 and can involve an operation 304 to interpret or determine operating parameters indicative of a thermal management condition, such as with respect to the aftertreatment device 80. The operating parameters can be, for example, any temperature input, a temperature at the inlet or other portion or portions of the aftertreatment device 80, a pressure drop across the aftertreatment device 80, a time since a last regeneration event, a catalyst and/or filter loading condition, an amount or estimate of particulate matter emitted from engine 12 since a last regeneration event, or any or other condition indicative of aftertreatment device performance that, when deficient, can be remedied through increasing a temperature of the exhaust gas. The operating parameters can be indicative of any one or combination conditions, such as a warm-up condition, a keep warm condition, a regeneration condition, hydrocarbon adsorption on the catalysts, soot or particulate accumulation on DPF 84, sulphur or other poisoning of one or more catalysts, and/or ammonia-sulphate based deposit accumulation.

In response to the interpretation or determination of the operating parameters at operation 304, procedure 300 continues at operation 306 to determine a thermal management condition. As discussed above, the thermal management condition can include, for example, at least one of a target temperature or target temperature range of the exhaust gas, or a target temperature or temperature range of one or more exhaust components and/or aftertreatment devices, a constituent in the exhaust gas, and combinations of these. In one embodiment, the thermal management condition can include one or more target conditions to obtain that vary according to the type of thermal management condition that is indicated.

Operation 308 includes determining current engine operating conditions of system 10. Interpreting current operating conditions can include, for example, determining an output torque and speed of engine 12, determining idle conditions of engine 12, determining an ambient temperature, determining an intake manifold temperature and pressure, determining a fresh air flow into the intake system, determining a mass flow rate or charge flow rate into cylinders 22 of engine 12, determining an exhaust flow rate, determining an EGR flow rate, determining a temperature of an aftertreatment component, and/or any other operating parameter.

Operation 310 includes selecting one or more engine operating modes at operations 312, 314, 316, 318, 320, 322 in response to the current operating conditions and the target operating condition to be provided to respond to the thermal management condition. Other operating modes than those in FIG. 3 are also contemplated and not precluded, such as activating an exhaust heater, HC dosing, EGR cooler bypass, and/or cylinder deactivation, and not all of the operating modes disclosed in FIG. 2 are required to be present. In one embodiment, the selection of the engine operating mode is automatic once a particular thermal management event indicator is identified, such as a desoot operation or warm-up operation. In another embodiment, the selection of engine operating modes can be prioritized, for example, in response to current engine operating conditions and the operating mode that most rapidly achieves the target condition based on the current engine operating condition, the distance of the current operating conditions from the target operating conditions, the most efficient operating mode based on current engine operating conditions, the operating mode that least impacts current operating conditions, or other criteria. One or more engine operating modes at operations 312, 314, 316, 318, 320, 322, 324 is selected and executed so as to adjust current engine operating conditions to obtain the target conditions described above. The engine operating modes include retarding timing of the cylinder combustion phasing 312, reducing rail pressure 314, restrict exhaust flow 316, reduce charge flow 318, injecting a quantity of fuel for a post-combustion heating 320, engine output increase 322, and early HCCI event 324.

Operation 312 includes an operating mode to retard the timing of the combustion phasing in one or more of cylinders 22. The combustion phasing is a measure of when the combustion of the fuel that is injected as part of a normal fuel injection event burns during the four strokes that the piston 24 completes during two separate revolutions of the engine's crankshaft 26. The normal fuel injection event can be selected, for example, from a set of engine parameter operating maps as a function of engine speed and torque demand, and the main injection timing and quantity, pilot and post injection timing and quantity, and the rail pressure and can be calibrated as a function of engine speed and load. Retarding the timing of the combustion phasing involves manipulating the fuel injection events or reducing the rail pressure in common rail 44 to delay the timing of the heat release thereby increasing the exhaust temperature. When all cylinders 22 are active and receiving fueling, retarding the timing of the combustion phasing can be employed with all cylinders 22, or with a subset of cylinders 22 that are active.

At operation 314, a reduce rail pressure mode of operation is selected that reduces fuel pressure in rail 44, causing higher exhaust temperature output from the cylinders 22. The rail pressure reduction slows the rate of heat release rate and reduces effective expansion ratio, thereby producing less torque output and more fuel energy being added to the exhaust.

At operation 316 a restrict exhaust flow mode of operation is selected in addition to one or more of operations 312, 314 or alternatively to operations 312, 314. The reduced thermal efficiency can include, for example, over-closing a VGT inlet to the turbine 56b, and/or closing exhaust throttle 74.

At operation 318 a reduce charge flow mode of operation is selected in addition to one more of operations 312, 314, 316 or alternatively to operations 312, 314, 316. The charge flow reductions concentrates the waste heat (or exhaust heat) into a smaller mass. The term "charge flow" herein means a flow of air and recirculated exhaust gas flows into the cylinder 22. Reducing a rate of fresh air flow at the same power level lowers the air to fuel ratio in cylinders 22, thereby, in general, resulting in an increase in the exhaust temperature.

In one example, lowering a rate of charge flow includes opening the VGT or the wastegate 56c, thereby reducing the available exhaust energy that flows into the turbine; this reduces the power to the compressor and generally leads reduced air flow into the engine. In another example, the intake air throttle 58 is partially closed to reduce the density of the charge flow entering the engine, again leading to reduced charge flow. In another example, exhaust throttle 74 is closed to decrease pumping mean effective pressure (PMEP) to reduce thermal efficiency.

At operation 320 a post main combustion injection of fuel is provided to increase the thermal output from one or more cylinders 22 for one or more cycles in addition to one or more of operations 312, 314, 316, 318 or alternatively to operations 312, 314, 316, 318. The quantity injected for operation 320 can be modulated to provide more or less heat output. Post main combustion injection can be employed on all or a subset of the cylinders 22.

At operation 322 an engine output adjustment is used to increase the exhaust heat output in addition to one or more of operations 312, 314, 316, 318, 320 or alternatively to operations 312, 314, 316, 318, 320. An engine output adjustment can be selected to increase the engine load and/or engine speed. Increasing the engine speed (rpm) can raise accessory and/or friction loads, thereby increasing exhaust gas temperature and an amount of heat that is output. The engine load can be increased externally or parasitically. An external or parasitic engine load can increase the required fueling per engine cycle, which can thereby increase the thermal energy to the exhaust system.

At operation 324, an early HCCI event is selected for at least one cycle of at least one cylinder 22 to increase the exhaust output as a supplement to one or more of the operations 312, 314, 316, 318, 320, 322. Alternatively, the HCCI event can be employed alone for thermal management. The early HCCI event occurs during the compression stroke at a timing that results in a very small effective expansion ratio so that little or no work is output by the piston 24 due to the HCCI event. In an embodiment, the HCCI event occurs during the compression stroke when the piston 24 is less than halfway from bottom-dead-center to top-dead-center. In an embodiment, the HCCI event occurs during the compression stroke when the piston is less than a quarter-way from bottom-dead-center to top-dead-center. In an embodiment, the HCCI event occurs at any point during the compression stroke between bottom-dead-center and top-dead-center.

The fuel for the HCCI event can be injected so that the fuel is combusted immediately after initiation of the compression stroke with the aid of increased in-cylinder temperature associated with an exhaust gas residual fraction in the cylinder 22. The exhaust gas residual fraction can be created prior to the HCCI event by over-closing the VGT or closing the exhaust throttle. In an embodiment, the fuel for the HCCI event is injected immediately after the exhaust valve closing associated with the exhaust stroke so the piston 24 is positioned to prevent the fuel from reaching the cylinder wall. Alternatively, fuel can be injected during the middle of the intake stroke when the high velocity of the intake flow will prevent the fuel from reaching the cylinder wall.

In an embodiment, the cylinders 22 employed in operating mode 324 can be rotated while the HCCI event mode of operation 324 is active to reduce thermal stresses on engine components and improve combustion stability. In an embodiment, the cylinder or cylinders 22 selected for the HCCI event are not scheduled for a subsequent nominal combustion event to prevent high NOx emissions that might result from the high in-cylinder temperature after the HCCI event, and/or to prevent high hydrocarbon and smoke emissions that might result from the reduced oxygen condition in the cylinder after the HCCI event. In an embodiment, operating mode 324 can be suspended during conditions in which high torque broadcast accuracy is required, such as during a transmission shift.

After selection of the mode or modes of operation, procedure 300 continues at operation 326 to operate system 10 in the one or more modes of operation 312, 314, 316, 318, 320, 322, 324 to obtain and/or remain at the target condition. It should be understood that selection of one or more modes of operation 312, 314, 316, 318, 320, 322, 324 may have multiple impacts on one or more operating parameters, and therefore the mix of impacts can be considered that produces the overall impact in the thermal output from the engine. For example, over-closing a VGT reduces thermal efficiency by decreasing PMEP, but may also increase charge flow. Therefore, the selection of one or more of the operating modes for control to provide the desired thermal output does not preclude other operating modes from being impacted from its current state or condition. Procedure 300 can end at 328 once the thermal management condition is satisfied so that nominal operations are resumed.

Various aspects of the present disclosure are contemplated. For example, one aspect includes a system. The system includes an internal combustion engine having a plurality of cylinders that receive a charge flow from an intake system, an exhaust system for receiving exhaust gas produced by combustion of a fuel provided to at least a portion of the plurality of cylinders from a fueling system in response to a torque request, and at least one aftertreatment device in the exhaust system. The system also includes at least one sensor operable to provide sensor information indicative of an operating condition of at least one of the engine, the intake system, the fueling system, the exhaust system, and the at least one aftertreatment device. The system further includes a controller connected to the at least one sensor operable to receive the sensor information from the at least one sensor and determine a thermal management condition in response to the sensor information. The controller is configured to produce a homogenous charge compression (HCCI) event in at least one of the plurality of cylinders for at least one cycle in response to the thermal management condition.

In an embodiment, the HCCI event occurs during a compression stroke of a piston in the at least one cylinder before the piston reaches top-dead-center. In one refinement of the embodiment, the HCCI event occurs during the compression stroke before the piston is more than half-way from bottom-dead-center to top-dead-center. In another refinement of the above embodiment, the HCCI event occurs during the compression stroke before the piston is more than quarter-way from bottom-dead-center to top-dead-center.

In another refinement of the above embodiment, the controller is configured to inject fuel for the HCCI event after an exhaust valve closes during one of an exhaust stroke and an intake stroke immediately prior to the compression stroke of the at least one cycle in which the HCCI event occurs. In a further refinement, the controller is configured to inject fuel during the exhaust stroke prior to the compression stroke of the at least one cycle in which the HCCI event occurs. In still a further refinement, the controller is configured to inject fuel during the intake stroke while the piston is more than half-way between bottom-dead-center and top-dead-center prior to the compression stroke of the at least one cycle in which the HCCI event occurs.

In an embodiment, fuel is not injected into the at least one cylinder during the at least one cycle subsequent to the HCCI event. In an embodiment, the HCCI event includes a plurality of HCCI events produced in response to the thermal management condition and the plurality of HCCI events are rotated among the plurality of cylinders over a plurality of cycles. In an embodiment, the controller is configured to disable the HCCI event in response to an engine operating condition requiring torque broadcast accuracy.

In another aspect, a method includes operating an internal combustion engine system including an internal combustion engine with a plurality of cylinders that receive a charge flow from an intake system, an exhaust system for receiving exhaust gas produced by combustion of a fuel provided to at least a portion of the plurality of cylinders from a fueling system in response to a torque request, and at least one aftertreatment device in the exhaust system; determining a thermal management condition associated with operation of the internal combustion engine; and operating the internal combustion to produce an HCCI event in at least one of the plurality of cylinders during at least one cycle in response to the thermal management condition.

In an embodiment, the HCCI event is produced to occur during a compression stroke of a piston is more than half-way from bottom-dead-center to top-dead-center. In an embodiment, the HCCI event is produced to occur during the compression stroke before the piston is more than quarter-way from bottom-dead-center to top-dead-center.

In an embodiment, the method includes injecting fuel for the HCCI event after an exhaust valve closes during one of an exhaust stroke and an intake stroke immediately prior to the compression stroke of the at least one cycle in which the HCCI event occurs. In an embodiment, fuel is not injected into the at least one cylinder during the at least one cycle subsequent to the HCCI event.

In an embodiment, the HCCI event includes a plurality of HCCI events produced in response to the thermal management condition and the plurality of HCCI events are rotated among the plurality of cylinders over a plurality of cycles. In an embodiment, the HCCI event is produced in response to the thermal management condition in conjunction with at least one other thermal management operation selected from the following: reducing a charge flow, increasing a charge flow temperature, and restricting an exhaust flow.

According to another aspect, a controller is provided that is configured to determine a thermal management condition associated with operation of the internal combustion engine, and operate the internal combustion to produce an HCCI event in at least one of the plurality of cylinders during at least one cycle in response to the thermal management condition.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine including a plurality of cylinders that receive a charge flow from an intake system, an exhaust system for receiving exhaust gas produced by combustion of a fuel provided to at least a portion of the plurality of cylinders from a fueling system in response to a torque request, and at least one aftertreatment device in the exhaust system;
at least one sensor operable to provide sensor information indicative of an operating condition of at least one of the engine, the intake system, the fueling system, the exhaust system, and the at least one aftertreatment device; and
a controller connected to the at least one sensor operable to receive the sensor information from the at least one sensor and determine a thermal management condition for the exhaust gas in response to the sensor information, wherein the controller is configured to select an operating mode that produces a homogenous charge compression (HCCI) event in at least one of the plurality of cylinders for at least one cycle to increase a temperature of the exhaust gas to satisfy a target condition for the exhaust gas exiting the at least one of the plurality of cylinders or in the exhaust gas in the exhaust system in response to the thermal management condition.

2. The system of claim 1, wherein the HCCI event occurs during a compression stroke of a piston in the at least one cylinder before the piston reaches top-dead-center.

3. The system of claim 2, wherein the HCCI event occurs during the compression stroke before the piston is more than half-way from bottom-dead-center to top-dead-center.

4. The system of claim 2, wherein the HCCI event occurs during the compression stroke before the piston is more than quarter-way from bottom-dead-center to top-dead-center.

5. The system of claim 2, wherein the controller is configured to inject fuel for the HCCI event after an exhaust valve closes during one of an exhaust stroke and an intake stroke immediately prior to the compression stroke of the at least one cycle in which the HCCI event occurs.

6. The system of claim 5, wherein the controller is configured to inject fuel during the exhaust stroke prior to the compression stroke of the at least one cycle in which the HCCI event occurs.

7. The system of claim 5, wherein the controller is configured to inject fuel during the intake stroke while the piston is more than half-way between bottom-dead-center and top-dead-center prior to the compression stroke of the at least one cycle in which the HCCI event occurs.

8. The system of claim 1, wherein the controller is configured to not inject fuel into the at least one cylinder during a cycle that is subsequent to the HCCI event while the at least one cylinder has a high in-cylinder temperature from the HCCI event.

9. The system of claim 1, wherein the HCCI event includes a plurality of HCCI events produced in response to the thermal management condition and the plurality of HCCI events are rotated among the plurality of cylinders over a plurality of cycles.

10. The system of claim 1, wherein the controller is configured to disable the HCCI event in response to an engine operating condition requiring torque broadcast accuracy.

11. The system of claim 1, wherein the controller is configured to produce the HCCI event during a compression stroke so that no work is produced by a piston in the at least one of the plurality of cylinders due to the HCCI event.

12. A method, comprising:
operating an internal combustion engine system including an internal combustion engine with a plurality of cylinders that receive a charge flow from an intake system, an exhaust system for receiving exhaust gas produced by combustion of a fuel provided to at least a portion of the plurality of cylinders from a fueling system in response to a torque request, and at least one aftertreatment device in the exhaust system;
determining a thermal management condition for the exhaust gas during operation of the internal combustion engine; and
operating the internal combustion to select an operating mode that produces an HCCI event in at least one of the plurality of cylinders during at least one cycle to increase a temperature of the exhaust gas to satisfy a target condition for the exhaust gas exiting the at least one of the plurality of cylinders or in the exhaust gas in the exhaust system in response to the thermal management condition.

13. The method of claim 12, wherein the HCCI event is produced to occur during a compression stroke of a piston is more than half-way from bottom-dead-center to top-dead-center.

14. The method of claim 12, wherein the HCCI event is produced to occur during the compression stroke before the piston is more than quarter-way from bottom-dead-center to top-dead-center.

15. The method of claim 12, further comprising injecting fuel for the HCCI event after an exhaust valve closes during one of an exhaust stroke and an intake stroke immediately prior to the compression stroke of the at least one cycle in which the HCCI event occurs.

16. The method of claim 12, wherein fuel is not injected into the at least one cylinder during a cycle that is subsequent to the HCCI event while the at least one cylinder has a high in-cylinder temperature from the HCCI event.

17. The method of claim 12, wherein the HCCI event includes a plurality of HCCI events produced in response to the thermal management condition and the plurality of HCCI events are rotated among the plurality of cylinders over a plurality of cycles.

18. The method of claim 12, wherein the HCCI event is produced in response to the thermal management condition in conjunction with at least one other thermal management operation selected from the following: reducing a charge flow, increasing a charge flow temperature, and restricting an exhaust flow.

19. The method of claim 12, wherein internal combustion engine is operated to produce the HCCI event during a compression stroke of the at least one cycle so that no work is produced by a piston in the at least one of the plurality of cylinders due to the HCCI event.

20. The method of claim 19, further comprising:
creating an exhaust gas residual fraction in the at least one of the plurality of cylinders prior to the at least one cycle in which the HCCI event is produced by over-closing a variable geometry turbine or exhaust throttle located in an exhaust passage downstream of the at least one of the plurality of cylinders; and
igniting the fuel injected for the HCCI event with an increased in-cylinder temperature created by the exhaust gas residual immediately after initiation of the compression stroke of the at least one cycle.

* * * * *